US008854219B2

(12) United States Patent
Assuncao et al.

(10) Patent No.: US 8,854,219 B2
(45) Date of Patent: Oct. 7, 2014

(54) SYSTEM, METHOD AND PROGRAM PRODUCT FOR PROVIDING POPULACE MOVEMENT SENSITIVE WEATHER FORECASTS

(75) Inventors: Marcos Dias De Assuncao, Sao Paulo (BR); Bruno Da Costa Flach, Copacabana (BR); Maira Athanazio de Cerqueira Gatti, Rio de Janeiro (BR); Takashi Imamichi, Kawasaki (JP); Marco Aurelio Stelmar Netto, Sao Paulo (BR); Raymond Harry Rudy, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/456,214

(22) Filed: Apr. 26, 2012

(65) Prior Publication Data
US 2013/0285820 A1    Oct. 31, 2013

(51) Int. Cl.
    *G08B 21/00*    (2006.01)
(52) U.S. Cl.
    USPC ............................................. 340/601; 702/3
(58) Field of Classification Search
    CPC ...................................................... G01W 1/00
    USPC ................... 340/601; 702/3, 179; 455/414.3; 715/771
    See application file for complete search history.

(56) References Cited

U.S. PATENT DOCUMENTS

| 7,043,368 B1* | 5/2006 | Cote et al. .......................... 702/3 |
| 7,349,768 B2 | 3/2008 | Bruce et al. |
| 7,949,330 B2* | 5/2011 | Yuhara et al. ............... 455/414.3 |
| 8,013,733 B1* | 9/2011 | Vallaire ....................... 340/539.1 |
| 8,018,332 B2* | 9/2011 | Boling et al. ............... 340/539.1 |
| 2009/0210353 A1* | 8/2009 | Mitchell et al. .............. 705/36 R |
| 2010/0042364 A1* | 2/2010 | Nakamura et al. ............ 702/179 |
| 2010/0090841 A1* | 4/2010 | Zhang et al. .................. 340/603 |
| 2010/0188205 A1 | 7/2010 | Dilbeck |
| 2011/0183644 A1 | 7/2011 | Gupta |

OTHER PUBLICATIONS

Sean Curtis, Stephen J. Guy, Basim Zafar, and Dinesh Manocha. Virtual Tawaf: A Case Study in Simulating the Behavior of Dense, Heterogeneous Crowds. 1st IEEE Workshop on Modeling, Simulation and Visual Analysis of Large Crowds, 2011.
gamma.cs.unc.edu/research/crowds/, 2012.
Sachin Patil, Jur van den Berg, Sean Curtis, Ming Lin, Dinesh Manocha. Directing Crowd Simulations Using Navigation Fields. IEEE Transactions on Visualization and Computer Graphics, 2012.
Stephen J. Guy, Sujeong Kim, Ming C. Lin and Dinesh Manocha. Simulating Heterogeneous Crowd Behaviors Using Personality Trait Theory. Eurographics/ ACM SIGGRAPH Symposium on Computer Animation, 2011.

(Continued)

*Primary Examiner* — Jeffery Hofsass
(74) *Attorney, Agent, or Firm* — Law Office of Charles W. Peterson, Jr.; Louis J. Percello, Esq.

(57) ABSTRACT

A weather forecast system, method of forecasting weather and a computer program product therefor. A forecasting computer applies a grid to a forecast area and provides a weather forecast for each grid cell. Population movement sensors sense population movement in the area. A swarm detector detects patterns in area population movement that indicate swarm activity, from which the swarm detector predicts swarm patterns. A planning module receives area weather forecasts and swarm patterns, and provides swarm path indications to the forecasting system for adjusting the grid applied to the forecast area.

25 Claims, 6 Drawing Sheets

(56) References Cited

OTHER PUBLICATIONS

Flora Ponjou Tasse. Crowd simulation of pedestrians in a virtual city, Bachelor of Science Honours, Rhodes University, 2008.

Wai Kin Victor Chan, Young-Jun Son. Simulation of Emergent Behavior and Differences Between Agent-Based Simulation and Discrete-Event Simulation. Winter Simulation Conference, pp. 135-150, 2010.

Oguzcan Oguz, Ates-Akaydin, Turker Yilmaz, Ugur Gudukbay, Emergency crowd simulation for outdoor environments. Computers & Graphics, n. 34, pp. 136-144, 2010.

B. Tatomir, L. Rothkrantz. Hierarchical Routing in Traffic Using Swarm-Intelligence, Intelligent Transportation Systems Conference, 2006. ITSC '06. IEEE.

D. Teodorovic. Transport Modeling by Multi-Agent Systems: a Swarm Intelligence Approach. Transportation Planning and Technology, Aug. 2003, vol. 26, No. 4, pp. 289-312.

PCT ISR Aug. 16, 2013.

* cited by examiner

SYSTEM, METHOD AND PROGRAM PRODUCT FOR PROVIDING POPULACE MOVEMENT SENSITIVE WEATHER FORECASTS

CROSS REFERENCE TO RELATED APPLICATIONS

The present application is related to U.S. patent application Ser. No. 13/251,889, "SYSTEM, METHOD AND PROGRAM PRODUCT FOR PROVIDING POPULACE CENTRIC WEATHER FORECASTS" to Victor Fernandes Cavalcante et al., filed Oct. 3, 2011; to U.S. patent application Ser. No. 13/275,313, "SYSTEM, METHOD AND PROGRAM PRODUCT FOR PROACTIVELY PROVISIONING EMERGENCY COMPUTER RESOURCES USING GEOSPATIAL RELATIONSHIPS" to Victor Fernandes Cavalcante et al., filed Oct. 18, 2011; and to U.S. patent application Ser. No. 13/290,334, "SYSTEM, METHOD AND PROGRAM PRODUCT FOR FLOOD AWARE TRAVEL ROUTING" to Victor Fernandes Cavalcante et al., filed Nov. 7, 2011, all assigned to the assignee of the present invention and incorporated herein by reference.

BACKGROUND OF THE INVENTION

1. Field of the Invention

The present invention is related to providing weather forecasts on wide geographic areas, and more particularly, to adjusting weather forecasts in response to population movement in a wide geographic area.

2. Background Description

Weather forecasts are based on weather data collected from sensors that are located over a large geographic area or even worldwide. In forecasting the weather for a wide geographic area, the area typically is divided into smaller more manageable units by a superimposing a grid over the area. Then, the relationship of the weather data among the several units or grid locations is described in several algebraic equations, e.g., using a Finite Element Model (FEM) for the gridded area. Frequently, the FEM requires a considerable, even excessive, amount of data processing resources.

Moreover, the higher the grid resolution, the larger the number of units, the more complex the FEM equations and, correspondingly, the more data processing resources consumed in generating weather forecasts. The data processing demands may be such that, it may be infeasible to provide real time or even timely forecasts for all grid locations. This is especially troublesome when, as is commonly the case, forecast results are subject to tight delivery deadlines. What is commonly known as adaptive mesh refinement (AMR) is a type of dynamic mesh refinement that has been used to selectively provide real time forecasts.

Adaptive mesh refinement begins with a low resolution grid for an area. The weather map contains coarse-grained cells to provide rough initial forecasts. Where more detailed forecasts are necessary for certain cells, provided there is sufficient data and time available, those cells are further refined. Typically, refinement is based on quality and quantity of sensors in the area, i.e., focus is on areas with more and better sensors. B. Plale et al., "CASA and LEAD: Adaptive Cyberinfrastructure for Real-Time Multiscale Weather Forecasting," *IEEE Computer Magazine,* 2006, provides an example of sensor based refinement, that focuses grid refinement on the sensors, i.e. sensor quality and quantity. However, sensor based refinement may not refine the forecast grid where people are, much less where they are headed.

Even when population is considered in forecasting, e.g., by sensor placement or otherwise, heavy weather, e.g., tornadoes or hurricanes, or local emergencies, may result in conditions that cause local evacuations. State of the art forecasting does not consider these emergencies in gridding an area. How the local populace evacuates an area, an example of swarm behavior, can vary widely depending on the situation, population and locale. Since almost by definition, evacuation means emptying a relatively densely populated area into relatively empty or less dense, low population areas, evacuating part of an area tends to render any current weather forecasts stale and inadequate.

Thus, there is a need for efficiently providing real time weather forecasts for large areas with a fluid population distribution; and, more particularly for efficiently and quickly adjusting weather forecasts for local population swarm behavior.

SUMMARY OF THE INVENTION

A feature of the invention is population swarm adjusted weather forecasts;

Another feature of the invention is population swarm adjusted grid refinement for weather forecasts;

Yet another feature of the invention is providing weather forecasts tailored to how a mobile or fluid population in a large area is reacting to local conditions;

Yet another feature of the invention swarm adjusted forecasts tailored to the needs of a mobile or fluid population in a large area and adapted for how the population is reacting to, or expected to react to, area inclement weather or area behavior, such as swarm activity and non-weather related events, e.g., emergencies.

The present invention relates to a weather forecast system, method of forecasting weather and a computer program product therefor. A forecasting computer applies a grid to a forecast area and provides a weather forecast for each grid cell. Population movement sensors sense population movement in the area. A swarm detector detects patterns in area population movement that indicate swarm activity, from which the swarm detector predicts swarm patterns. A planning module receives area weather forecasts and swarm patterns, and provides swarm path indications to the forecasting system for adjusting the grid applied to the forecast area.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
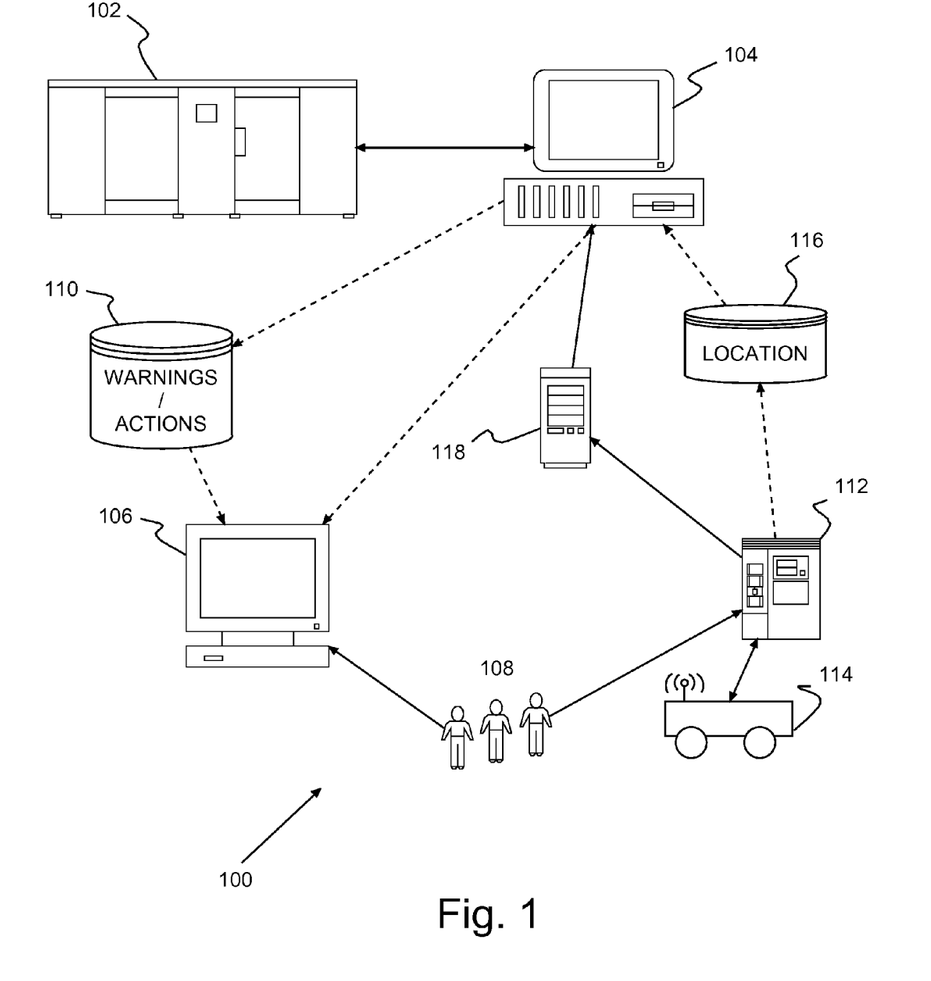
FIG. 1 shows an example of a swarm behavior detection and forewarning system according to a preferred embodiment of the present invention.

Turning now to the drawings and more particularly, FIG. 1 shows an example of a swarm adjusted, population centric weather forecasting system 100, wherein a forecasting system 102 and a planning module 104 coactively forecast overall area weather and adjust weather forecasting constraints based on detected swarm activity according to a preferred embodiment of the present invention. An example of a suitable forecasting system 102, that may be adapted for use in the present invention, is the populace centric forecasting system described in U.S. patent application Ser. No. 13/251,889, "SYSTEM, METHOD AND PROGRAM PRODUCT FOR PROVIDING POPULACE CENTRIC WEATHER FORECASTS" to Victor Fernandes Cavalcante et al. (Cavalcante), filed Oct. 3, 2011, assigned to the assignee of the present invention and incorporated herein by reference. In Cavalcante the forecasting grid applied to the area was refined based on population concentration, but not how the crowd might respond to environmental factors.

While crowd modeling and simulation has been considered for application elsewhere, it has not heretofore been applied to weather forecasting. Examples of prior attempts at such other applications include: system planning; understanding the behavior of large crowds and pedestrians; comprehending human motion in constrained environments; adjusting system capacity to flash crowd conditions; defining the behavior of characters in games and movies; and, in implementing motion patterns for robotic systems. Primarily, these applications and simulations have been used to approximate crowd behavior. Several techniques have been attempted including using agent-based simulations, navigation fields and personality traits. Previously, these techniques were used to help understand how crowds behave under emergency and evacuation situations, and for example, for planning locations for doors, gates and emergency exits.

However, a preferred system 100 dynamically refines forecasts for regions of interest, performing an overall area and cell by cell mesh refinement based on population swarm behavior. Thus, the system 100 provides a detailed, swarm adjusted custom weather forecast for planning and responding to local events. The system 100 detects swarm behavior, predicts and, optionally, automatically sends information and warnings about current regions of interest to affected populace and to regional (e.g., city, town, neighborhood) forecast and planning systems. Thus, forewarned regional systems can then simulate various local conditions, such as traffic, and plan expected emergency service deployments, e.g., rescue personnel. Thus forewarned, such deployment is better planned to respond to the conditions causing the population movement, because the planning is based on swarm activity reflected in current crowd movement or expected crowd movement within a given time horizon.

It should be noted that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As also shown in the example of FIG. 1, a preferred system 100 includes a notification system 106 notifying users in the local population 108 of warnings 110 for the area. A swarm detector 112 detects and projects population 108 swarm paths from behavior detected by sensors 114 in the area. The swarm detector 112 passes predicted populace location and populace behavior 116 to the preferred planning module 104. The swarm detector 112 also redirects any mobile sensors 114 to swarm locations based on predicted populace, e.g., to regions where the coverage is otherwise low. A grid/region correlation detector 118 determines a geospatial-temporal correlation for the area among critical regions with other regions, correlating the swarm path/behavior with grid cells. The planning module 104 identifies cells for further resolution based on this geospatial-temporal correlation, and passes the determination, e.g., a revised grid, for a refined forecast to the forecasting system 102. Although shown in multiple independent computers, it is understood that the subsystems 102, 106, module 104 and detectors 112 may be collocated together in one or more individual computers. Further, although communications are shown by direct connection, it is further understood that communications may be over a network connecting system elements 102-106, 119-118 together.

Optionally, in addition to forecasting weather related events, the system 100 can be equipped to warn the local populace and provide emergency guidance for other types of unscheduled and/or unexpected events, e.g., earthquakes, gas pipeline leaks, vehicle accidents, and biological hazards. Once a particular forecast is complete, the notification system 106 warns the population 108 of the concerned area(s), e.g., using multiple different media, individually or, preferably, simultaneously. Those media can include, but are not limited to, audio media (e.g., radio), video media (e.g., television), cellular/text/Internet Protocol (IP) based media (e.g., chat or text messaging) and social networking websites (e.g., Facebook and Twitter).

Broadcasting these warnings willy-nilly to the general population without careful planning as was done previously, might otherwise exacerbate the emergency, e.g., by causing traffic jams that clog escape routes. Advantageously, however, the preferred system 100 provides decision-makers with a clear picture of critical areas in real time and a clear indication of how that picture is likely to change during and after the particular event. Thus, authorities may work to reduce the occurrence of problems with unmanaged such events, providing targeted warnings directed primarily to those that may be affected by the event or the aftermath of the event.

Figure 2:
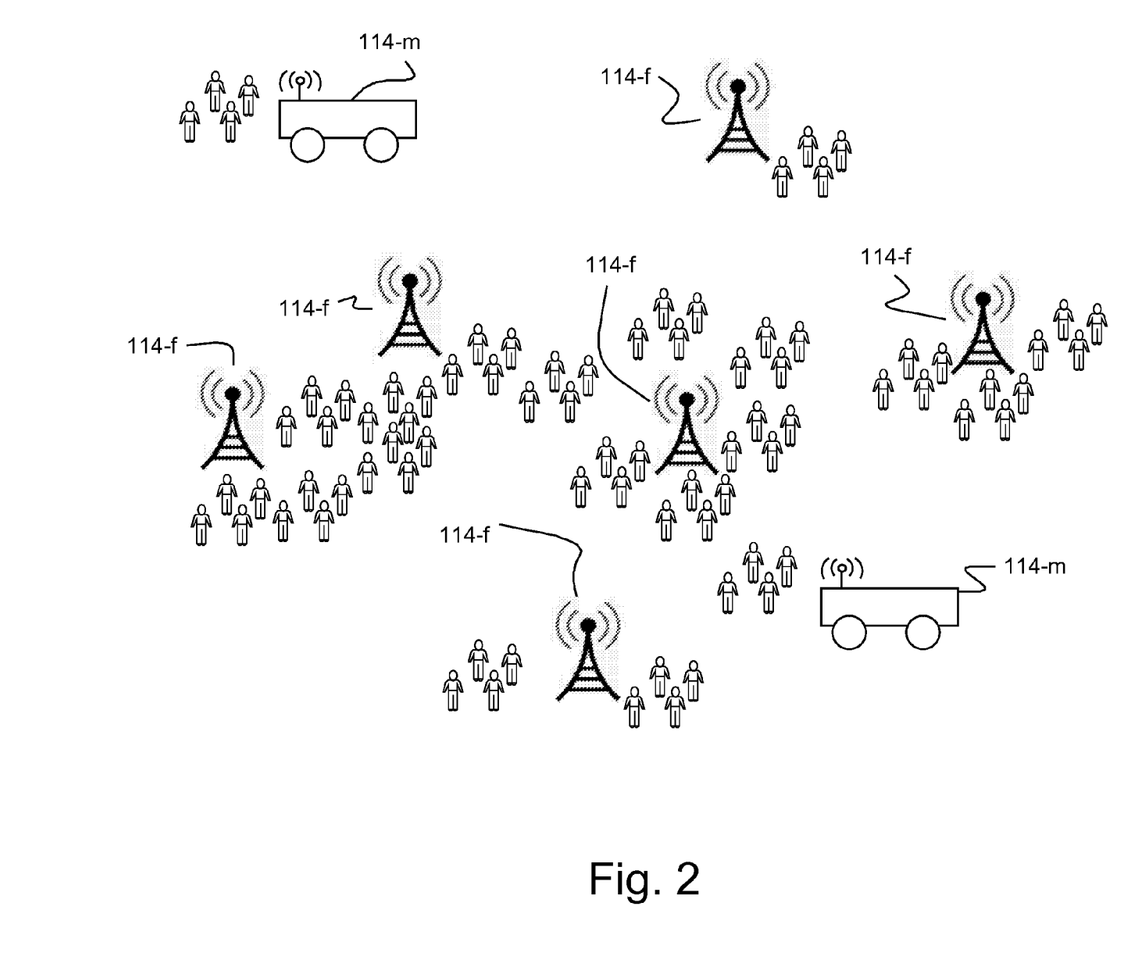
FIG. 2 shows an example of swarm flow and detection of the local population in an area served by a cellular phone or cell phone system.

FIG. 2 shows an example of swarm flow of the local population 108 in an area served by a cellular phone or cell phone system, for application of the preferred embodiment of the example of FIG. 1. Flow sensors 114 of this example include both fixed sensors 114-$f$ (e.g., special purpose sensors, cell towers, etc.) and mobile sensors 114-$m$, e.g., one or more mobile cell phone users.

In a typical cell phone network, the area serviced by the network is divided into cells, each serviced by a cell phone tower 114-$f$, and once connected, can place and receive calls. Typically, cell phones in the particular cell connect to the network through the respective tower 114-$f$ As each cell phone enters a particular cell, the phone registers with the tower 114-$f$, essentially connecting to the network through the tower 114-$f$ Thus each particular tower 114-$f$ is aware of all of the connected cell phones and the connecting cell phones as well, and therefore, the tower is aware of the cell population and changes in the population.

The mobile sensors 114-$m$ may be dispatched to regions where coverage is otherwise low and, further, complement locational sensing accuracy. The mobile sensors 114-$m$ include both fixed sensors suitable for monitoring populace movement/mobility in the immediate location, e.g., video surveillance and public WiFi, and moveable sensors including, for example, mobile hot spots. Thus, mobile sensors 114-$m$ can be allocated for regions where fixed sensor 114-$f$ coverage is low, e.g., in planning for upcoming weather/events, or on the fly in real time in responding to an emergency. A suitable standard optimization method, such as semidefinite programming (SDP) relaxation, may be used to determine an optimal mobile sensor 114-$m$ allocation to cover a sufficient portion of a crowd.

Each cell tracks and reports changes in cell population, which each cell typically does normally. The cell phone system can collect population movement data for the entire area based on cell phone user movement. Thus, with fixed sensor 114-$f$ information supplemented with sufficient mobile sensor 114-$m$, that data may be used to predict swarms as they occur in the area. Thus, application of the present invention to an area facilitates a responsible area authority in managing developing/ongoing swarm type behavior in response to weather related and non-weather related events (e.g., emergencies) to a rapid, and much safer, conclusion. Route recommendation may be verified by comparing a current, determined crowd path against a predicted path, and moreover, by whether the traffic flows smoothly in that current path, e.g., is free of traffic jams.

A preferred forecasting system 102 provides environmental forecasts for the original area and refined cells to the planning module 104. Environmental forecasts may include, for example, weather forecasts, flooding predictions, and traffic flow forecasts. The forecasting system 102 forecasts based on, for example, data collected from weather sensors (not shown) in combination with computer simulations, e.g., as described by Cavalcante. The planning module 104 provides the forecasting system 102 with swarm prediction population adjustments for gridding the area for refining forecasts according to those adjustments. Alternately, the planning module 104 may revise the grid and provide the forecasting system 102 with the revised grid. Guided by the current populace density 116 and the geospatial-temporal correlation from the grid/region correlation detector 118, the planning module 104 also generates a series of targeted warnings 110 presented by the warning system 106 to the population 108 of the affected regions.

Figure 3A:
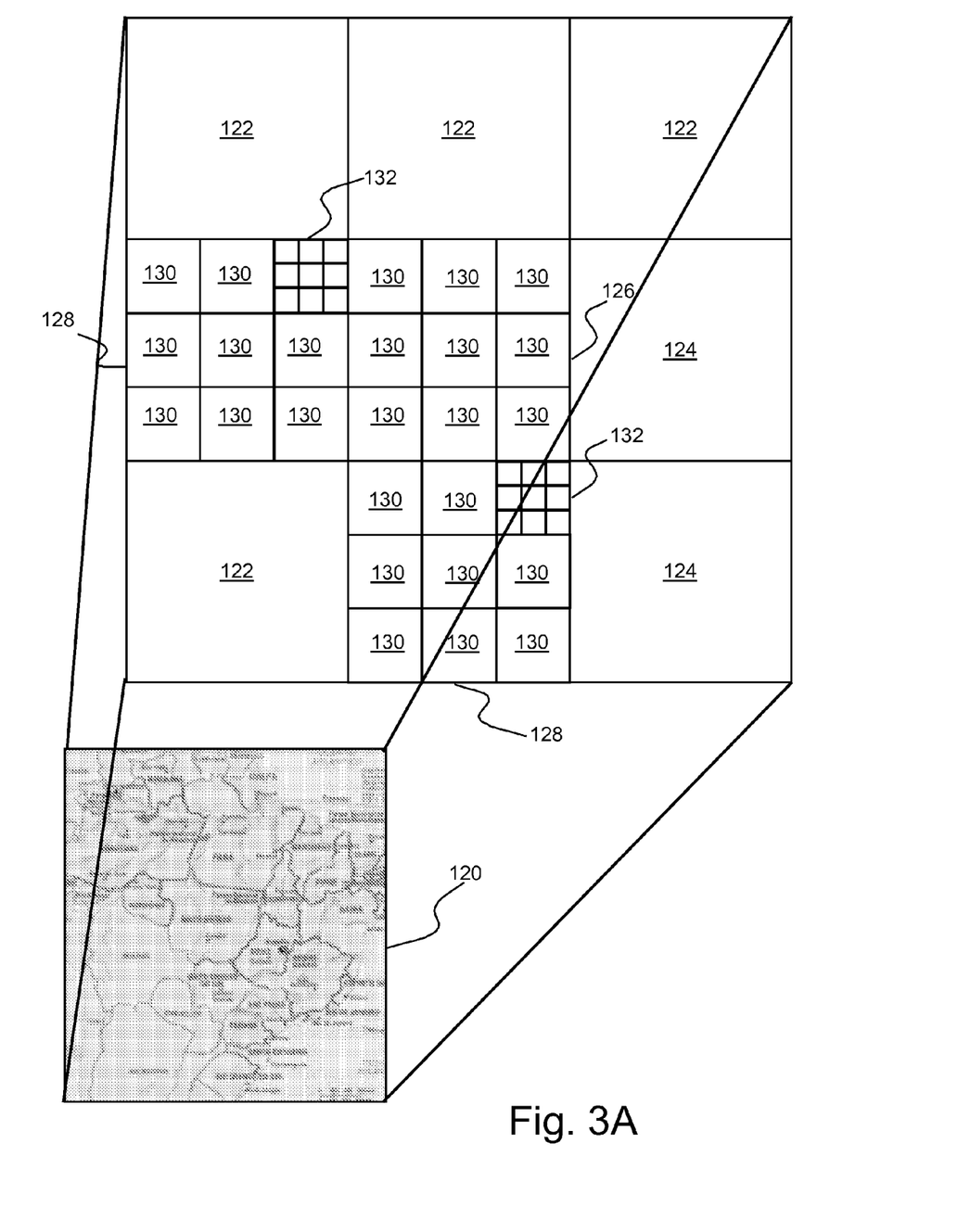
FIGS. 3A-B show a simple example comparing refinement of a forecast for a wide area and refinement according to a preferred embodiment of the present invention.
Figure 3B:
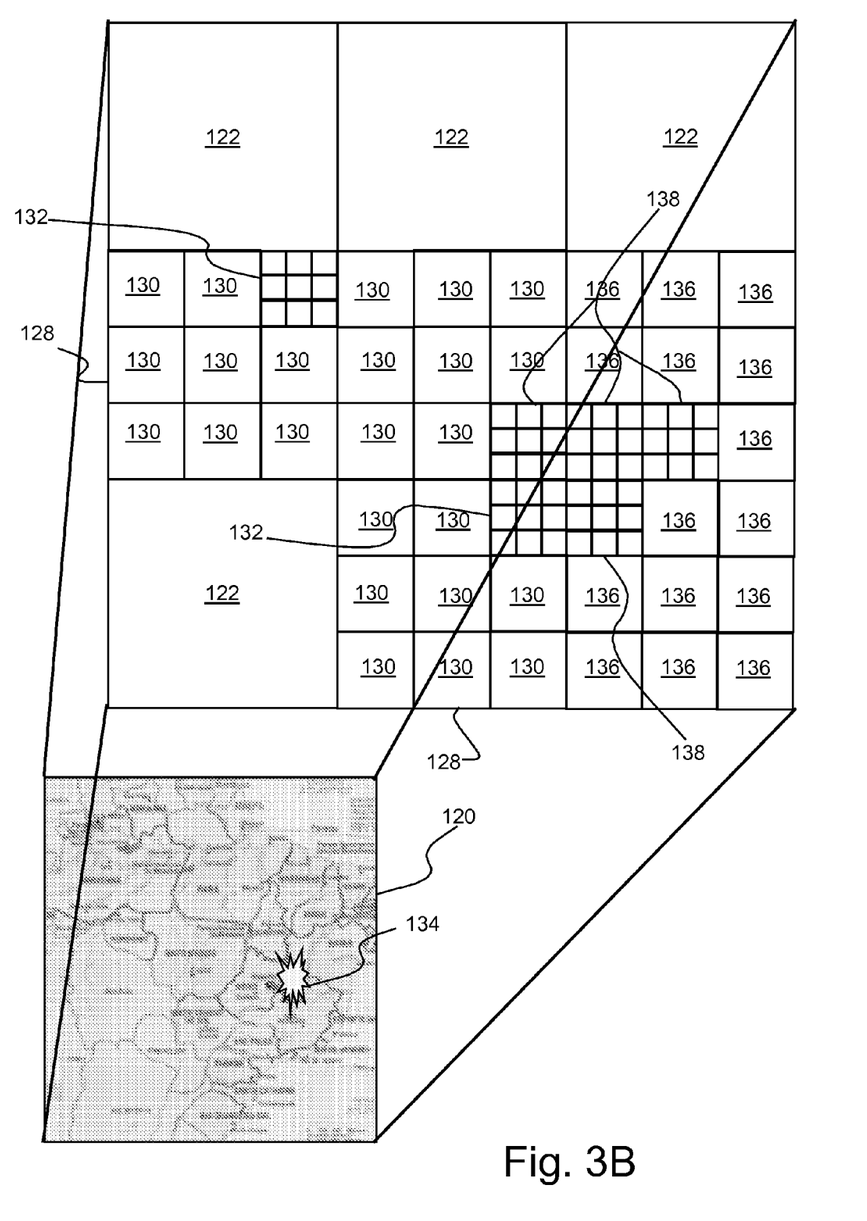

FIGS. 3A-B shows a simple example comparing refinement of a forecast for a wide area 120, wherein grid refinement is as described by Cavalcante as compared to swarm detection and refinement according to a preferred embodiment of the present invention. In the initial iteration a three by three (3×3) square cell grid is overlaid on wide area 130. In the populace centric example of FIG. 3A, cells 122, 124 are marked complete after the first, coarse iteration with cells 126, 128 remaining unmarked. Cells 126, 128, which may contain, for example, cities, villages or some other static or transient human activity, are further refined for a more comprehensive forecast. With each iteration, unmarked areas may be prioritized by weighting information from static data (e.g., fixed population and scheduled events) and dynamic data (e.g., transient population and historic events) to grid the areas and forecast weather for increasingly smaller geographic regions.

So after the first iteration the grid is refined with a set of sub-regions only for each unmarked cell 126, 128, i.e., a locally higher resolution 3×3 grid. The forecast is further refined using the more refined grid in a second iteration, with the forecast complete for refined grid cells 130. In a third and final iteration, unmarked cells 132 further refine the grid with a still smaller 3×3 grid. The occurrence of an unexpected non-weather related event, such as an emergency or unexpected movement (e.g., the beginning of swarm behavior), would not be considered by Cavalcante, at least until movement changed the area population distribution sufficiently to merit changes in one or more iteration.

As shown in the example of FIG. 3B, however, a preferred system 100 reacts to an unexpected event 134 by refining the grid where a swarm is detected and expected to form in the affected coarse grid cells 124, 126. In the second iteration, in addition to refining the grid in cells 126, 128 with a locally higher resolution 3×3 grid, cells 124 adjacent to, or in the area affected by, the event are refined as well. Further, in the next/final iteration in addition to a more refined grid in cells 132, the higher resolution, more refined grid is used in cells 136 as well.

Figure 4:
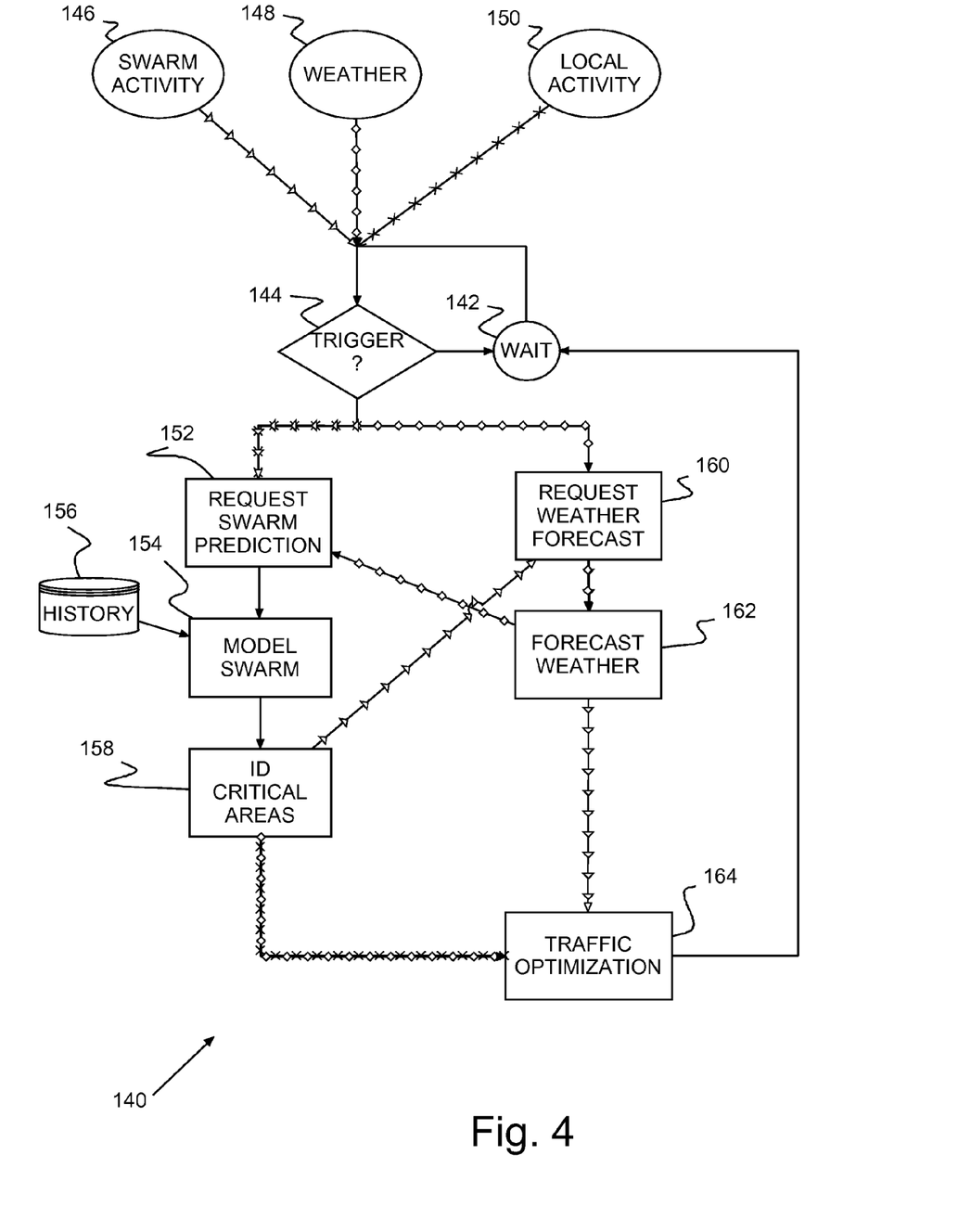
FIG. 4 shows an example of operation of a preferred planning module.

FIG. 4 shows an example of operation 140 of a preferred planning module 104 according to a preferred embodiment of the present invention with reference to the system 100 of FIG. 1. Preferably, the preferred planning module 104 remains dormant, e.g., waiting 142 until a trigger arrives 144. There are typically three types of triggers, a behavioral trigger 146 and two types of event triggers 148, 150. Identified swarm activity triggers 146 the planning module 104, independent of weather 148 and local activity 150. When there is no swarm activity, the occurrence of inclement weather 148 and/or emergencies 150 trigger the planning module 104. The type of trigger 146, 148, 150 determines the planning module 104 response. The planning module 104 responds to both swarm activity 146 and inclement weather 148 triggers by requesting swarm behavior from the swarm detector 112 and a weather forecast from the forecasting system 102 with the order of each request depending upon the trigger 146, 148. The planning module 104 responds to emergencies triggers 150 by requesting swarm behavior from the swarm detector 112, i.e., weather may not be requested.

The swarm detector 112 detects the current location of area populace, monitors travel/movement in the general population for swarm activity, and provides a trigger 146 in response to finding the initial conditions of a swarm. When a trigger 146 indicates swarm behavior was detected, the planning module 104 returns a request 152 to the swarm detector 112 to predict the expected swarm behavior, e.g., the swarm path.

Whether monitoring for swarm activity or in response to a request 152, the swarm detector 112 analyzes the population movement and predicts trends, e.g., general movement or flow, by simulating the swarm behavior. Suitable such models for detecting or predicting swarm behavior and identify population movement (swarm activity) are described by Tatomir et al., "Hierarchical Routing in Traffic Using Swarm-Intelligence," *Intelligent Transportation Systems Conference*, 2006, ITSC '06, IEEE and Teodorovic "Transport Modeling by Multi-Agent Systems: a Swarm Intelligence Approach," *Transportation Planning and Technology*, August 2003, Vol. 26, No. 4, pp. 289-312, both incorporated herein by reference. Optionally, the swarm detector 112 can include historical data 156 that reflects movement tendencies in predicting general population response, e.g., movement or flow. When the general movement or flow indicates swarm behavior, the swarm detector 112 provides the swarm trigger 146 to the planning module 104.

The planning module 104 identifies critical areas 158 based on the predicted swarm behavior, e.g., areas where a large number of travelers are expected. The planning module 104 requests 160 weather and flooding predictions from the forecasting system 102 for those critical areas, e.g., with the area gridded based on the projected swarm flow. When the planning module 104 receives 162 the forecast, the planning module 104 passes the results to a traffic optimization module 164 to iteratively arrive at an optimal traffic flow.

When a trigger 148 indicates flooding or inclement weather was detected, the planning module 104 returns a request 160 for weather and flooding predictions from the forecasting system 102 for those critical areas, e.g., with the area gridded based on the projected swarm flow, e.g., as shown in the example of FIG. 3B. When the planning module 104 receives 162 the forecast, a request 152 is sent to the swarm detector 112 to predict 156 the expected swarm behavior. Again, the planning module 104 passes the results to a traffic optimization module 164 to iteratively arrive at an optimal traffic flow during the inclement weather and/or any flooding.

As noted hereinabove, if the trigger 150 indicates an emergency is developing, weather is ignored. The planning module 104 returns a request 152 to the swarm detector 112 to predict the expected swarm behavior 154. The planning module 104 identifies critical areas 158 based on the predicted swarm behavior, and passes the results to a traffic optimization module 164 to iteratively arrive at an optimal traffic flow during the emergency.

Figure 5:
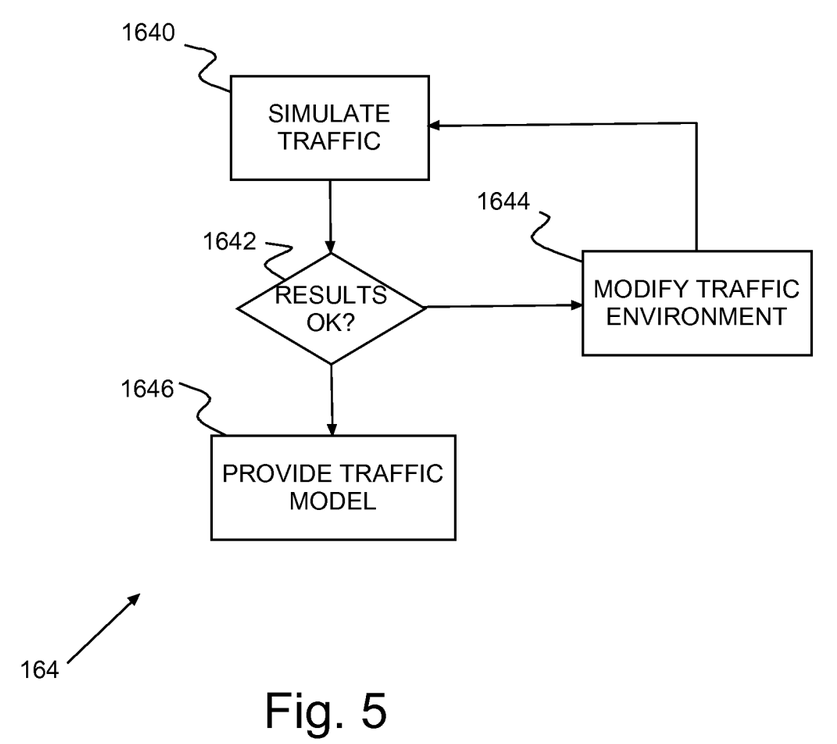
FIG. 5 shows an example of a preferred traffic optimization module.

FIG. 5 shows an example of a traffic optimization module 164. In each iteration a traffic simulator 1640 simulates traffic in the critical areas. If the simulation iteration 1640 provides unacceptable results 1642, e.g., traffic jams or dangerous situations, then the traffic simulation conditions are modified 1644 iteratively to improve traffic flow and/or reroute traffic around critical areas. For example, high occupancy vehicle (HOV) lanes may be opened or reversed to facilitate traffic through the critical areas; two way streets may be converted to one way and the direction on one way streets may be selectively reversed; traffic lights may be retimed and resynchronized; warnings may be retargeted (e.g., to more/fewer area travelers) or otherwise modified; and emergency response vehicles may be dispatched. The traffic optimization module 164 reruns the traffic simulation 1640 under the modified conditions and re-checks 1642 until the results are acceptable. Once the traffic optimization module 164 finds an acceptable plan 1642 the traffic optimization module 164 institutes 1646 the plan, and in FIG. 4, the planning module 104 returns to the wait state 142.

Thus, advantageously, the present invention facilitates forecast and planning for more accurate, swarm driven results for higher priority regions, e.g., areas with extreme weather events have a greater impact on local populace. Forecast resource prioritization reduces computing and storage resource requirements for forecasting and simulating weather and emergency effects. Also, the preferred system 100 provides decision-makers with a clear picture of critical areas in real time and a clear indication of how that picture is likely to change during and after the particular event. Thus, the present invention enables authorities to reduce the occurrence of problems with unmanaged such events, by providing targeted warnings directed primarily to those that may be affected by, or the aftermath of, the event.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A weather forecast system comprising:
a forecasting system providing a gridded weather forecast for an area;
one or more population movement sensors sensing population movement in said area;
a swarm detector detecting patterns in said population movement indicating swarm activity and predicting swarm patterns responsive to said swarm activity; and
a planning module receiving area weather forecasts and said swarm patterns, said forecasting system adjusting a grid applied to said area responsive swarm path indications from said planning module.

2. A weather forecast system as in claim 1, wherein said planning module further receives indications of non-weather related events and responsive thereto, provides said swarm path indications to said forecasting system.

3. A weather forecast system as in claim 1, further comprising a grid correlation detector correlating said predicted swarm patterns with cells in a current pattern and providing said correlation to said planning module.

4. A weather forecast system as in claim 1, wherein said planning module further generates warnings responsive to a revised forecast based on an adjusted said grid.

5. A weather forecast system as in claim 4, further comprising a notification system notifying affected population, said planning module providing said warnings to said notification system for notifying said affected population.

6. A weather forecast system as in claim 1, wherein said one or more population movement sensors include at least one fixed sensor.

7. A weather forecast system as in claim 6, wherein said at least one fixed sensor includes at least one cell phone tower, and said one or more population movement sensors include at least one mobile sensor, said at least one mobile sensor including at least one cell phone.

8. A method of forecasting weather, said method comprising:
forecasting weather for an area, said area being overlain with a populace centric grid segmenting said forecast area into cells, weather being forecast for each area within each said cell;
monitoring for indications within one or more of said cells of population swarming to or from one or more different locations;
revising said grid for population swarm responsive to each indication;
re-forecasting weather for said area with said area being overlain with said revised grid;
and once population swarm has ceased returning to forecasting the weather with a populace centric grid.

9. A method of forecasting weather as in claim 8, wherein monitoring for indications comprises:
monitoring for inclement weather;
monitoring area population movement sensors for population movement in said area; and
detecting sensed population movement indicating swarm associated area behavior.

10. A method of forecasting weather as in claim 9, wherein responsive to indications of inclement weather, said method comprises requesting a determination of current and expected population swarms.

11. A method of forecasting weather as in claim 9, wherein said area population movement sensors sense movement from area cell phones moving between cell phone cells in said area, and, swarm associated area behavior comprises:
indications of a swarm in said sensed cell phone movement; and
indications of non-weather related events in said area.

12. A method of forecasting weather as in claim 11, wherein responsive to indications of said swarm, said method comprises:
requesting a determination of a path of a current swarm; and
requesting a current weather forecast along said path.

13. A method of forecasting weather as in claim 11, wherein responsive to indications of said non-weather related events, said method comprises requesting a determination of a path of an expected swarm, said non-weather related events comprising the occurrence of emergencies.

14. A computer program product for forecasting weather, said computer program product comprising a non-transient computer usable medium having computer readable program code stored thereon, said computer readable program code causing one or more computer executing said code to:
forecast weather for an area, said area being overlain with a populace centric grid segmenting said forecast area into cells, weather being forecast for each area within each said cell;
monitor for indications within one or more of said cells of population swarming to or from one or more different locations;
revise said grid for population swarm responsive to each indication;
re-forecast weather for said area with said area being overlain with said revised grid; and once population swarm has ceased
return to forecasting the weather with a populace centric grid.

15. A computer program product for forecasting weather as in claim 14, wherein monitoring for indications comprises said one or more computer:
  monitoring for inclement weather;
  monitoring area population movement sensors for population movement in said area; and
  identifying sensed population movement indicating swarm associated area behavior.

16. A computer program product for forecasting weather as in claim 15, wherein responsive to indications of inclement weather, said one or more computer requests a determination of current and expected population swarms.

17. A computer program product for forecasting weather as in claim 15, wherein monitoring said area population movement sensors monitors cell phones moving between cell phone cells in said area, and, swarm associated area behavior comprises:
  indications of a swarm in said sensed cell phone movement; and
  indications of non-weather related events in said area, said non-weather related events including emergencies.

18. A computer program product forecasting weather as in claim 17, wherein responsive to indications of said swarm, said one or more computer requests a determination of a path of a current swarm and a current weather forecast.

19. A computer program product forecasting weather as in claim 17, wherein responsive to indications of said non-weather related events, said one or more computer requests a determination of a path of an expected swarm.

20. A computer program product for forecasting weather, said computer program product comprising a computer usable medium having computer readable program code stored thereon, said computer readable program code comprising:
  computer readable program code means for providing a gridded weather forecast for an area;
  computer readable program code means for receiving population information from one or more population movement sensors in said area;
  computer readable program code means for detecting movement patterns indicating swarm activity from said population information;
  computer readable program code means for predicting swarm patterns responsive to said swarm activity; and
  computer readable program code means for receiving area weather forecasts and said swarm patterns, said computer readable program code means for providing a gridded weather forecast adjusting a weather forecast grid applied to said area responsive to said swarm path indications.

21. A computer program product for forecasting weather as in claim 20, wherein said area population movement sensors include a local cell phone system, said computer readable program code means for receiving population information receives indications of area cell phone locations, and said computer readable program code means for detecting movement patterns monitors said cell phone locations moving between cell phone cells in said area, said computer readable program code means for forecasting weather further comprising computer readable program code means for waiting for population movement indicating swarm activity.

22. A computer program product for forecasting weather as in claim 20, further comprising computer readable program code means for correlating said predicted swarm patterns with cells in a current pattern.

23. A computer program product for forecasting weather as in claim 20, wherein said computer readable program code means for detecting movement patterns detect non-weather related events causing movement in said area.

24. A computer program product for forecasting weather as in claim 20, further comprising computer readable program code means for generating targeted warnings responsive to a revised forecast based on an adjusted said weather forecast grid.

25. A computer program product for forecasting weather as in claim 24, further comprising computer readable program code means for notifying affected population responsive to said targeted warnings.

* * * * *